(12) United States Patent
Sissoev et al.

(10) Patent No.: US 12,526,040 B2
(45) Date of Patent: Jan. 13, 2026

(54) METHOD AND APPARATUS FOR CALIBRATING A SINGLE ANTENNA RF INTERFACE CABLE

(71) Applicant: AEROANTENNA TECHNOLOGY, INC., Chatsworth, CA (US)

(72) Inventors: Alex Sissoev, Chatsworth, CA (US); Joseph Klein, Chatsworth, CA (US)

(73) Assignee: AEROANTENNA TECHNOLOGY, INC., Chatsworth, CA (US)

( * ) Notice: Subject to any disclaimer, the term of this patent is extended or adjusted under 35 U.S.C. 154(b) by 446 days.

(21) Appl. No.: 18/207,992

(22) Filed: Jun. 9, 2023

(65) Prior Publication Data
US 2024/0413897 A1 Dec. 12, 2024

(51) Int. Cl.
*H04B 7/185* (2006.01)
*H04B 17/14* (2015.01)

(52) U.S. Cl.
CPC ......... *H04B 7/18543* (2013.01); *H04B 17/14* (2015.01)

(58) Field of Classification Search
CPC .............................. H04B 17/14; H04B 7/18543
See application file for complete search history.

(56) References Cited

U.S. PATENT DOCUMENTS

2021/0124012 A1* 4/2021 Inoue ................... G01S 7/4021

* cited by examiner

*Primary Examiner* — Timothy A Brainard
(74) *Attorney, Agent, or Firm* — Burr & Forman

(57) ABSTRACT

A calibration unit for calibrating a single cable interface operably coupling an SDU to an antenna includes a calibration loopback path operably coupled to a first path of the antenna and a second path of the antenna, a first path switch and a second path switch operably coupled to the first and second paths of the antenna, respectively, to alternately connect and disconnect the first and second paths of the antenna to the calibration loopback path where the first and second paths of the antenna are operably coupled to a first end of the single cable interface, a first detector operably coupled to a second path of the SDU among a first path of the SDU and the second path of the SDU that are each operably coupled to a second end of the single cable interface, the first detector being configured to detect a first signal at the second path of the SDU, an SDU DSP operably coupled to the first detector, a second detector operably coupled to the first path of the antenna to detect a second signal at the first path of the antenna, and an antenna DSP operably coupled to the second detector. The antenna DSP determines a first gain adjustment based on a test signal inserted at the first path of the SDU and the first signal and the second signal, and the SDU DSP determines a second gain adjustment based on the test signal, the first signal and the second signal.

12 Claims, 7 Drawing Sheets

METHOD AND APPARATUS FOR CALIBRATING A SINGLE ANTENNA RF INTERFACE CABLE

TECHNICAL FIELD

Example embodiments generally relate to the antenna subsystem interfaces and, more particularly, relate to calibration of a single cable antenna interface.

BACKGROUND

Modern antenna subsystems often incorporate complex electronics to aid in signal control and conditioning (gain and power), antenna pointing vector (beam) forming and steering, and built-in test and diagnostics equipment (BITE) functions (for example, reading antenna temperature, etc.). Most of the time, these functions are performed with, or controlled by, the radio. Moreover, in many situations, multiple RF signals (for transmission or reception) are routed to a single antenna subsystem. All of this can be accomplished by using multiple interface cables.

However, using multiple cables (e.g., multiple coaxial cables) can be both complicated and costly when considering the effort to route and connect each one, and to thereafter provide maintenance for the system. Moreover, the overall weight of the system (due to the weight of the cables) can become significant as more and more cables are added for additional functions and interconnections. The weight issue may not matter in certain contexts. However, particularly in aerospace applications, weight is definitely an important consideration.

An improvement upon this system was demonstrated in U.S. Pat. No. 10,693,529, which is incorporated herein by reference in its entirety. In that improvement, it was required to calibrate a single cable antenna interface so that all multiplexed signals have known (i.e. equal) amplitude at their respective end points. However, that improvement did not consider the specific context of a satellite data unit (SDU) and automated calibration.

Accordingly, it may be desirable to further improve this technology in order to reduce the installation complexity, system component count, maintenance effort, and overall system weight.

BRIEF SUMMARY OF SOME EXAMPLES

Some example embodiments may provide a method and apparatus for accomplishing a calibration procedure automatically by employing the SDU and the antenna built-in processing logic. The ability to multiplex these signals may allow a single coaxial cable to replace many such cables, and may reduce installation complexity, part count, cost, maintenance effort, and overall system weight.

In an example embodiment, a calibration unit for calibrating a single cable interface operably coupling a satellite data unit (SDU) to an antenna may be provided. The calibration unit may include a calibration loopback path operably coupled to a first path of the antenna and a second path of the antenna, a first path switch and a second path switch operably coupled to the first and second paths of the antenna, respectively, to alternately connect and disconnect the first and second paths of the antenna to the calibration loopback path where the first and second paths of the antenna are operably coupled to a first end of the single cable interface, a first detector operably coupled to a second path of the SDU among a first path of the SDU and the second path of the SDU that are each operably coupled to a second end of the single cable interface, the first detector being configured to detect a first signal $P_B$ at the second path of the SDU, an SDU digital signal processor (DSP) operably coupled to the first detector, a second detector operably coupled to the first path of the antenna to detect a second signal P at the first path of the antenna, and an antenna DSP operably coupled to the second detector. The antenna DSP determines a first gain adjustment based on a test signal inserted at the first path of the SDU and the first signal $P_B$ and the second signal $P_A$, and the SDU DSP determines a second gain adjustment based on the test signal, the first signal $P_B$ and the second signal $P_A$.

In another example embodiment, an antenna subsystem may be provided. The antenna subsystem may include an SDU, an antenna and a single cable interface for operably coupling the SDU to the antenna, and a calibration unit for calibrating the single cable interface. The calibration unit may include a calibration loopback path operably coupled to a first path of the antenna and a second path of the antenna, a first path switch and a second path switch operably coupled to the first and second paths of the antenna, respectively, to alternately connect and disconnect the first and second paths of the antenna to the calibration loopback path where the first and second paths of the antenna are operably coupled to a first end of the single cable interface, a first detector operably coupled to a second path of the SDU among a first path of the SDU and the second path of the SDU that are each operably coupled to a second end of the single cable interface, the first detector being configured to detect a first signal $P_B$ at the second path of the SDU, an SDU digital signal processor (DSP) operably coupled to the first detector, a second detector operably coupled to the first path of the antenna to detect a second signal $P_A$ at the first path of the antenna, and an antenna DSP operably coupled to the second detector. The antenna DSP determines a first gain adjustment based on a test signal inserted at the first path of the SDU and the first signal $P_B$ and the second signal $P_A$, and the SDU DSP determines a second gain adjustment based on the test signal, the first signal $P_B$ and the second signal $P_A$.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
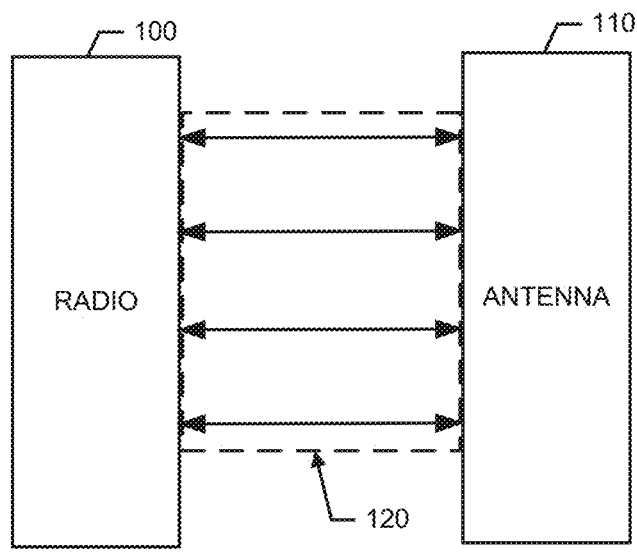
FIG. 1 illustrates a conventional multi-cable interface for connecting an antenna subsystem to a radio.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 2:
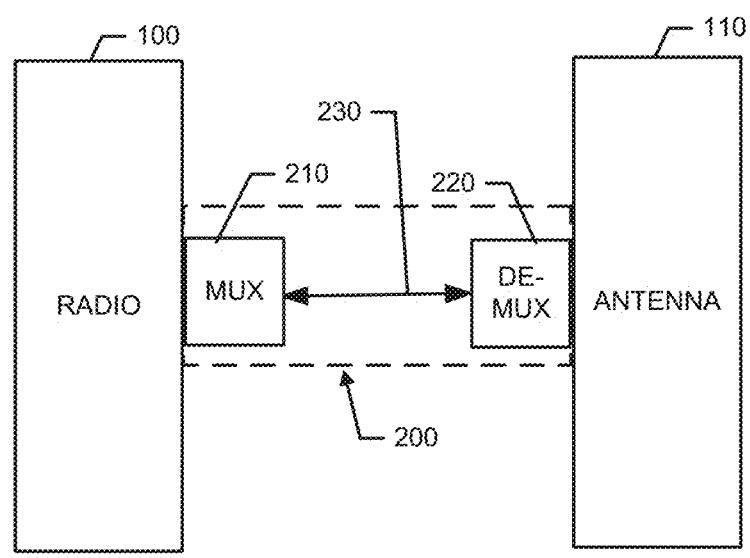
FIG. 2 illustrates block diagram of a single cable interface of an example embodiment.

As discussed above, the example of FIG. 1, uses many cables to control the various functions of the antenna subsystem. Meanwhile, example embodiments of the present invention provide a way to multiplex several antenna subsystem signals onto a single RF coaxial cable. These signals can be of different types, such as RF modulated carrier signals for transmission or reception by the antenna subsystem, digital data signals for antenna subsystem control and functions, and discrete analog signals, such as a synchronization pulse. Moreover, as discussed in greater detail below, the signals may include calibration signals in some cases. FIG. 2 illustrates a block diagram of an example embodiment as applied to an air-to-ground (ATG) radio and corresponding antenna. However, as will be discussed in reference to FIG. 6, similar principles may apply to satellite contexts involving an SDU.

Referring now to FIG. 2, the radio 100 and the antenna 110 may essentially be the same components described above. However, the multi-cable interface 120 of FIG. 1 is completely replaced by a single cable interface 200. The single cable interface 200 may include a signal multiplexer 210 and a signal de-multiplexer 220 on each opposing end of a single RF coaxial cable 230. FIG. 2 shows the signal multiplexer 210 on the radio side of the single cable interface 200, and the signal de-multiplexer 220 on the antenna side of the single cable interface 200. However, it should be appreciated that multiplexing and de-multiplexing functions may be swapped for receiving (as opposed to transmitting) signals as well. Thus, these components can be functionally swapped dependent on the direction of data flow. Moreover, in some embodiments, the devices that form respective instances of multiplexers and de-multiplexers may be provided at each respective end of the single cable interface 200, and may be capable of performing both functions dependent on the direction of data flow to permit full two-way operation of example embodiments.

Example embodiments may provide (via the single cable interface 200) the ability to combine several identical RF modulated carrier signals, which can have the same frequency, level, modulation type, baseband characteristics, and even identical information payload, into a single cable medium. This may be accomplished by converting the signal(s) with the same carrier frequency to a different frequency using the frequency mixer principle shown in Equation (1) below:

$$f = f_C \pm f_{LO} \qquad (1)$$

In Equation (1), f is the frequency resulting after mixing the original carrier frequency, $f_C$, with the local oscillator frequency, $f_{LO}$. It is important to note that the method utilizes a single local oscillator for this purpose. The local oscillator may, for example, be located in the radio 100 in the example shown. This eliminates the risk of the converted frequencies being misaligned and avoids the need for additional timing synchronization between the radio 100 and the antenna 110 (or antenna subsystem).

Another feature of example embodiments is the use of a radio transceiver to convert the digital data, which may be coming in on any standard digital bus, into a high frequency modulated radio signal (for example, amplitude shift keying (ASK), frequency shift keying (FSK), phase shift keying (PSK), frequency modulation (FM), etc.) and sending the digital data over the single cable interface 200 (e.g., via the signal multiplexer 210). The single cable interface 200 also provides the ability to then receive the signal coming from the other side and convert the signal back into properly formatted digital data (e.g., via the signal de-multiplexer 220).

Figure 3:
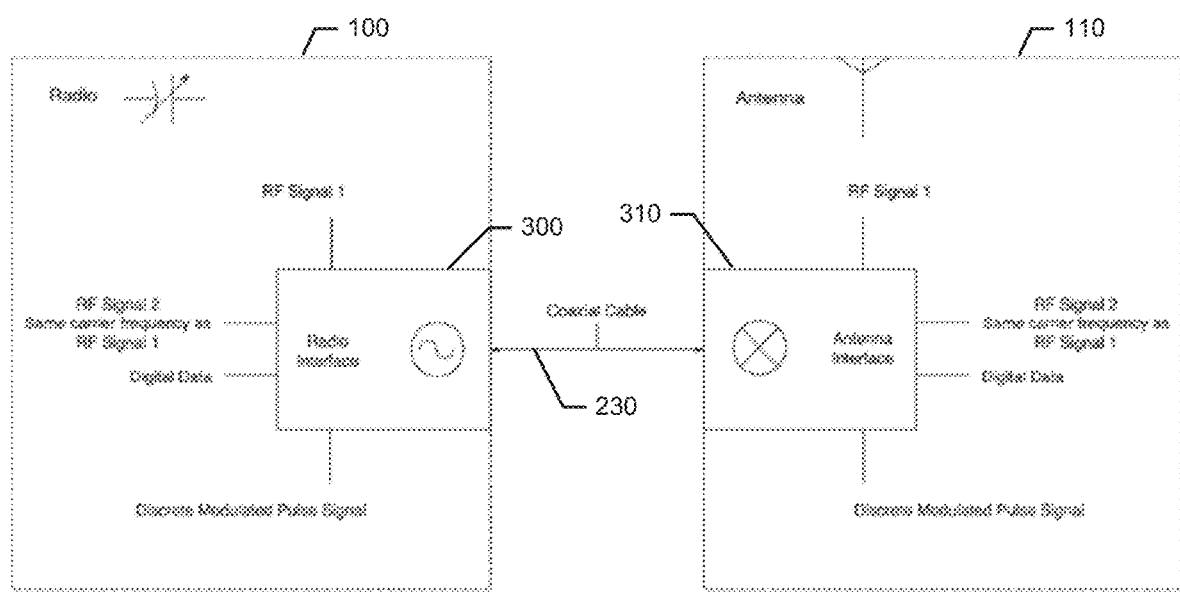
FIG. 3 illustrates a system block diagram of the single cable interface of FIG. 2 in one example context.

A discrete analog pulse may also be used to switch (e.g., using on/off keying (OOK) modulation) another local oscillator (LO) to send an OOK modulated carrier over the single cable interface 200. The discrete analog pulse may be used for various purposes including, for example, synchronizing the radio and antenna subsystem execution timings. FIG. 3 illustrates a system block diagram showing the example of FIG. 2 within a particular context in which a first RF signal (RF Signal 1) and a second RF signal (RF Signal 2) are applied to an example embodiment of the signal multiplexer 200 (i.e., radio interface 300). The radio interface 300 also includes a Digital Data signal and a Discrete Modulated Pulse Signal applied thereto. The first and second RF signals in this example each have the same carrier frequency.

As can be seen from FIG. 3, the radio interface 300 multiplexes all of the signals (i.e., the first and second RF signals, the Digital Data signal and a Discrete Modulated Pulse Signal) onto the single RF coaxial cable 230 for receipt at an example embodiment of the signal de-multiplexer 210 (i.e., the antenna interface 310). The antenna interface 310 is then configured to extract each of the respective multiplexed signals. Thus, the antenna interface 310 is shown producing the first and second RF signals, the Digital Data signal and a Discrete Modulated Pulse Signal all for use at the antenna 110.

Figure 4:
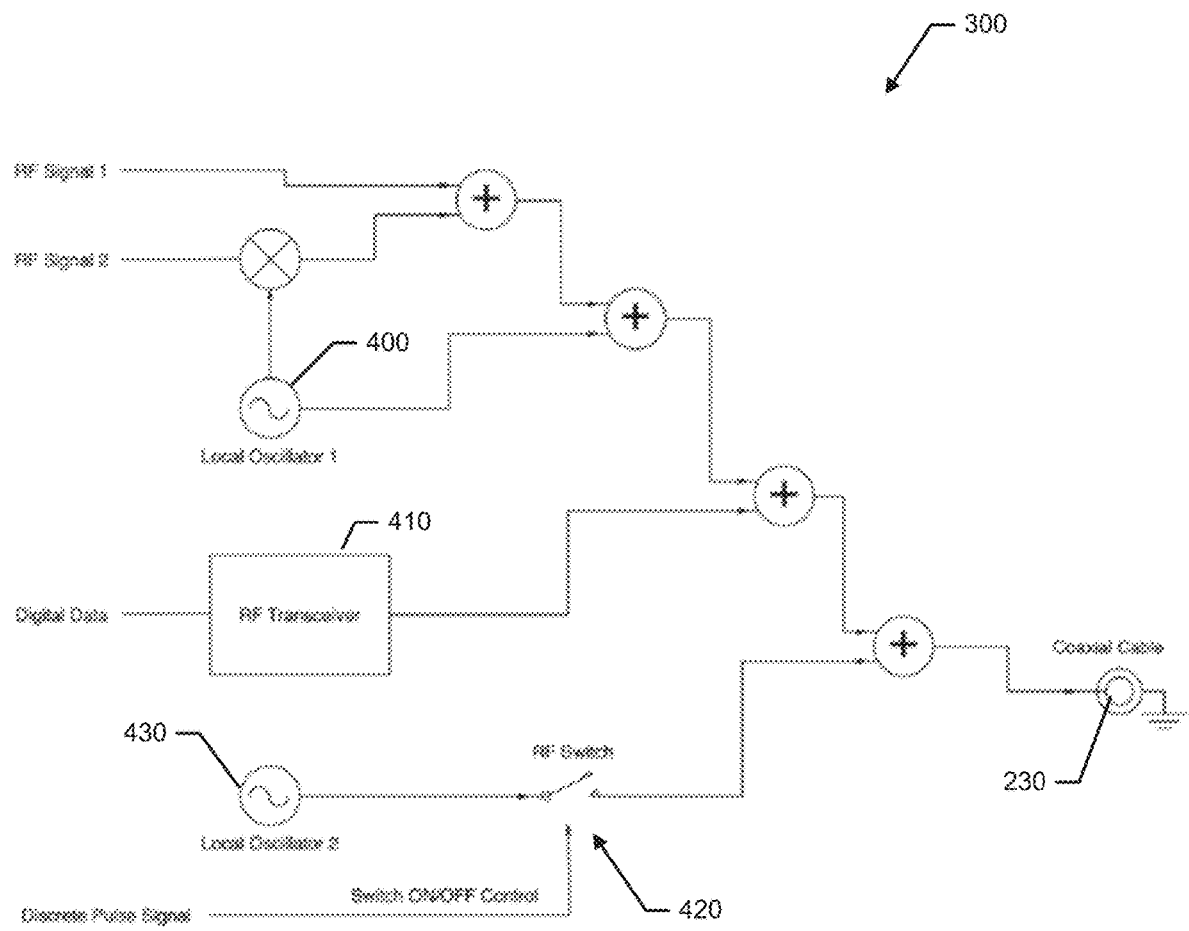
FIG. 4 illustrates a block diagram of a single cable interface multiplexer in accordance with an example embodiment.
Figure 5:
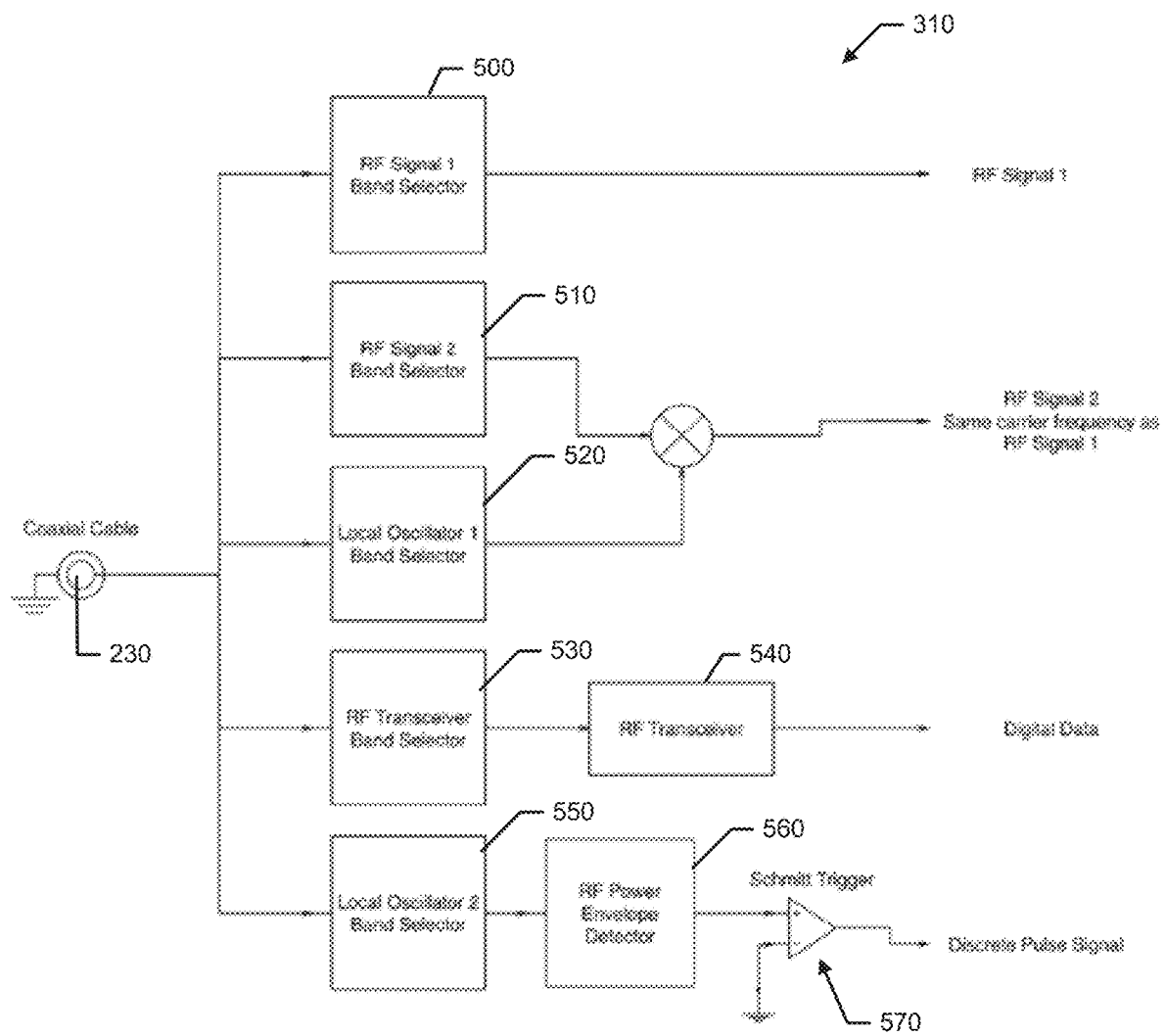
FIG. 5 illustrates a block diagram of single cable de-multiplexer in accordance with an example embodiment.

FIGS. 4 and 5 will now be referenced to describe an example embodiment of the signal multiplexer 210 and radio interface 300 (FIG. 3) and the signal de-multiplexer 220 and antenna interface 310 (FIG. 4) that may be used in the system of FIGS. 2 and 3, respectively. Referring now to FIGS. 4 and 5, the first RF signal (i.e., RF Signal 1) is ideally passed onto (or received unaltered from) the single RF coaxial cable 230 via the radio interface 300. Meanwhile, at the antenna side (shown for this example in FIG. 5), RF Signal 1 is extracted via the first band selector 500. The first band selector 500 is configured to perform the following function shown in Equation (2):

$$A(f, t) = \begin{cases} A(f, t), & \text{for } f > f_{MIN} \\ A(f, t), & \text{for } f < f_{MAX} \\ 0, & \text{otherwise} \end{cases} \qquad (2)$$

In Equation (2), A(f,t) is the amplitude of the signal, which is a function of the frequency of the signal and the time. The value fMIN is the minimum frequency of the signal band, and fMAX is the maximum frequency of the signal band (which is RF Signal 1, in this case). By applying equation (2), the first band selector 500 removes the other signals multiplexed onto the single RF coaxial cable 230, and passes only RF Signal 1.

RF Signal 2, originally having the same carrier frequency as RF Signal 1, gets up or down frequency-converted according to Equation (1) using a local oscillator 400, which produces a Local Oscillator 1 signal. By doing this, any interference with the RF Signal 1 can be avoided and the frequency converted RF Signal 2 can be multiplexed onto the single RF coaxial cable 230 as shown in FIG. 4. At the same time, the Local Oscillator 1 signal is passed unaltered onto the single RF coaxial cable 230. As illustrated in FIG. 5, both the RF Signal 2 and the Local Oscillator 1 signal are passed through respective band selectors (i.e., second band selector 510 and third band selector 520, respectively). The second and third band selectors 510 and 520 are also configured to employ the processing described by Equation (2) for their respective frequency bands. Then, as shown in FIG. 5, the output (modified) RF Signal 2 from the second band selector 510 is mixed with Local Oscillator 1 signal output from the third band selector 520 according to Equation (1) and the resulting signal is the RF Signal 2 with its original carrier frequency (equal to that of RF Signal 1.

As shown in FIG. 4, formatted Digital Data may be fed into (or out of) RF transceiver 410. The RF transceiver 410 may be configured to modulate (or demodulate) the Digital Data onto (or from) a discrete carrier frequency using any modulation type (e.g., ASK, FSK, PSK, FM, etc.). In this way, the Digital Data can be transferred by an RF carrier in the single RF coaxial cable 230. As illustrated in FIG. 5, this signal may be passed through a fourth band selector 530 (e.g., an RF Transceiver Band Selector) and transformed according to Equation (2). The result may then be fed into (or out from) RF Transceiver 540. RF Transceiver 540 may be configured to convert the resultant output from the fourth band selector 530 to (or from) formatted Digital Data.

The Discrete Pulse Signal (which may be an analog signal) is also shown in FIG. 4, and may be used as an ON/OFF control for an RF Switch 420. A second local oscillator 430 may be used to generate a Local Oscillator 2 signal, which may be turned on or off using the RF Switch 420 and multiplexed onto the single RF coaxial cable 230 according to the functional table 1 shown below:

TABLE 1

| Discrete Analog Pulse State | RF Switch State | Local Oscillator 2 State |
|---|---|---|
| Pulse High | ON | Multiplexed |
| Pulse Low | OFF | Not Multiplexed |

At the antenna subsystem side (i.e., FIG. 5), the Local Oscillator 2 signal may be fed a fifth band selector 550, which may be configured to extract the Local Oscillator 2 signal. The fifth band selector 550 may be configured to perform the transformation according to Equation (2). An output of the fifth band selector 550 may be fed into an RF power envelope detector 560. The RF power envelope detector 560 may be configured to perform the following function in Equation (3):

$$V_{OUT} = V(P_{RFIN}) \quad (3)$$

In Equation (3), the RF Power Envelope Detector output voltage, VOUT, is a function of the RF power level of the signal coming into the RF power envelope detector 560, PRFIN. VOUT of the RF power envelope detector 560 may be connected to the input, VIN, of a Schmitt Trigger circuit 570. The Schmitt Trigger circuit 570 may be configured to function according to Equation (4):

$$V_{ST}(V_{IN}) = \begin{cases} V_{MAX}, & \text{for } V_{IN} > V_{TH} \\ 0, & \text{for } V_{IN} < V_{TH} \end{cases} \quad (4)$$

In Equation (4), $V_{ST}$ is the output voltage of the Schmitt Trigger circuit 560, $V_{MAX}$ is the maximum output voltage of the Schmitt Trigger circuit 560, and VTH is a preset threshold level that may be set at any (sensitivity) level between 0 and $V_{MAX}$. In this manner, if the Local Oscillator 2 signal level exceeds the preset threshold level, a voltage high level is produced. Otherwise, the voltage is at the low level (0). This can now be easily digitized for any form of digital signaling.

As can be appreciated from FIGS. 4 and 5, any number of RF signals could be included in example embodiments, so long as a corresponding number of additional local oscillators and band selectors are also added. Moreover, other signals could also be added over the single RF coaxial cable 230 by being treated in similar manners to those described above. Thus, the concepts associated with example embodiments are fully scalable. Additionally, as noted above, the architecture works in both directions (receive and transmit) and the respective interfaces (i.e., the radio interface 300 and antenna interface 310) flip their roles between multiplexing or de-multiplexing depending on the direction of flow through the system.

In a general sense, example embodiments may therefore provide an architecture for multiplexing RF signals with the same carrier frequency, phase, and modulation type onto a single RF coaxial cable using frequency mixing with a single local oscillator (Local Oscillator 1) and band selectors corresponding to the number of signals being multiplexed. Example embodiments may also provide a method of transmitting digital data (i.e., the Digital Data of FIGS. 3-5) by multiplexing an RF modulated carrier onto a single coaxial cable using an RF transceiver. Example embodiments may also provide an architecture for multiplexing discrete analog pulses (e.g., the Discrete Pulse signal of FIG. 4) onto a single RF coaxial cable using a local oscillator (e.g., Local Oscillator 2) and an RF switch, along with an RF envelope detector, and a Schmitt Trigger.

As discussed above, it is often required to calibrate a single cable antenna interface, such as single cable interface 200 discussed above (or the single RF coaxial cable 230 thereof), so that all multiplexed signals have known (i.e. equal) amplitude at their respective end points. Example embodiments may provide such a calibration procedure automatically by employing built-in processing logic of the satellite data unit (SDU) and/or the antenna.

Figure 6:
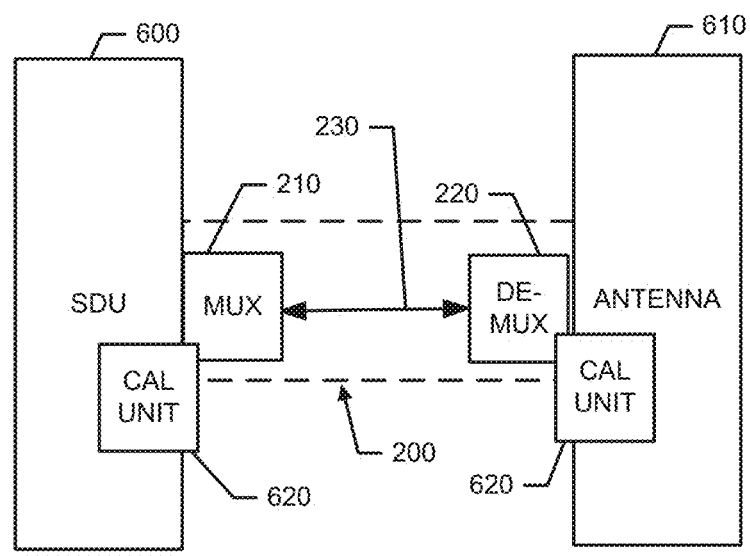
FIG. 6 illustrates block diagram of a single cable interface in a satellite context and including a calibration unit of an example embodiment.

FIG. 6 illustrates the single cable interface 200 (and single RF coaxial cable 230 of FIGS. 2-5) disposed between an SDU 600 and an antenna 610. A calibration unit 620 is also provided to facilitate the calibration mentioned above. In this regard, whenever two or more signals are multiplexed onto a single interface cable (e.g., the single RF coaxial cable 230) between the SDU 600 and the antenna 610, it is either desirable or required to calibrate their amplitudes at each of their respective end points. The variation of signal amplitudes is due to the insertion losses in the multiplexing interface and the single RF coaxial cable 230 (used to interface the SDU 600 to the antenna 610). These insertion losses are variable, for example, due to production tolerances or a variable cable type and length (of the single RF coaxial cable 230) used in the system setup. Moreover, SDUs and antennas may often be mixed and matched interchangeably. Therefore it is highly desirable to have a built-in automated calibration apparatus (e.g., calibration unit 620) in such a system in order to mitigate the aforementioned insertion losses.

Figure 7:
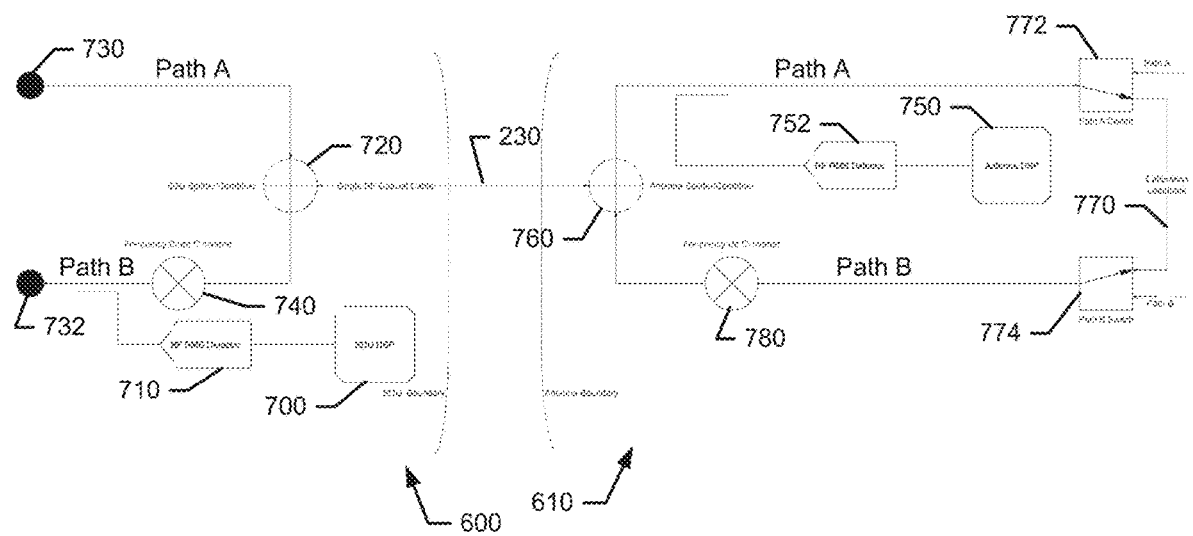
FIG. 7 illustrates components of the SDU and antenna including the calibration unit of an example embodiment.

FIG. 7 illustrates some aspects of the calibration unit 620 in greater detail. Referring now to FIG. 7, the SDU 600 may include a digital signal processor (SDU DSP 700) and a first detector 710 (e.g., an RF RMS Detector). Meanwhile, the single RF coaxial cable 230 may be operably coupled to the SDU 600 via a SDU splitter/combiner 720. The SDU splitter/combiner 720 may split signals to or combine signals from various paths including, for example, a first path (Path A) and a second path (Path B) of the SDU 600. In an example embodiment, the SDU splitter/combiner 720 may also perform multiplexing operations (e.g., corresponding to multiplexer 210 of FIG. 6). The first and second paths may be operably coupled to other components of the SDU 600 via a path A connector 730 and a path B connector 732, respectively. In an example embodiment, a frequency down converter 740 may be provided in path B as a portion of the calibration unit 620. Moreover, the first detector 710 is operably coupled to detect signal activity in path B of the SDU 600.

The antenna 610 may include a digital signal processor (antenna DSP 750) and corresponding second detector 752 (e.g., an RF RMS Detector). Meanwhile, the single RF coaxial cable 230 may be operably coupled to the antenna 610 via an antenna splitter/combiner 760. The antenna splitter/combiner 760 may split signals to or combine signals from various paths including, for example, a first path (Path A) and a second path (Path B) of the antenna 610. In an example embodiment, the antenna splitter/combiner 760 may also perform de-multiplexing operations (e.g., corresponding to de-multiplexer 220 of FIG. 6). The first and second paths may be operably coupled to other components of the antenna 610 via respective path connectors (not shown), but also connectable to a calibration loopback path 770 of the calibration unit 620 via a path A switch 772 and a path B switch 774. In an example embodiment, a frequency up converter 780 may be provided in path B as a portion of the calibration unit 620. Moreover, the second detector 752 may be operably coupled to detect signal activity in path A of the antenna 610.

A test signal of known, characterized amplitude, $P_{TEST}$, may be fed into the path A connector 730. The test signal (i.e., $P_{TEST}$) may traverse path A and be operably coupled onto the single RF coaxial cable 230 via the SDU splitter/combiner 720 (acting as multiplexer 210 of FIG. 6). After traversing the single RF coaxial cable 230, the signal may be de-multiplexed via the antenna splitter/combiner 760 (acting as de-multiplexer 220 of FIG. 6). The test signal amplitude is then detected and measured by the second detector 752 and the antenna DSP 750 to produce $P_A$, which is the input power value for signal path A in the antenna 610. The path A switch 772 in the antenna 610 is switched to connect to the calibration loopback path 770, and the path B switch 774 in the antenna 610 is also switched to connect to the calibration loopback path 770. This operably couples the test signal, $P_{TEST}$, to path B of the antenna 610 to be up-converted in frequency by the frequency up converter 780. The test signal, $P_{TEST}$, is then multiplexed back onto the single RF coaxial cable 230 via the antenna splitter/combiner 760 (now acting as multiplexer 210) and the test signal, $P_{TEST}$, then traverses the single RF coaxial cable 230 back to the SDU 600. The test signal, $P_{TEST}$, is then de-multiplexed by the SDU splitter/combiner (now acting as de-multiplexer 220) and is down converted by frequency down converter 740 to attempt to recover (at the path B connector 732) the original signal frequency inserted at the path A connector 730. In this regard, the amplitude of the test signal, $P_{TEST}$, as modified by the signal paths and components traversed, is detected and measured by the first detector 710 and SDU DSP 700 to produce $P_B$, which is the received power value for signal path B in the SDU 600. Thus, $P_B$ represents a modification to the test signal, $P_{TEST}$, based on all insertion losses for the signal paths traversed. The insertion losses for the traversed signal paths may be characterized for calibration purposes as follows:

$$IL_A = \frac{P_{TEST}}{P_A}$$

$$IL_B = \frac{P_A}{P_B}$$

where:
$IL_A$ is the insertion loss for Signal Path A.
$IL_B$ is the insertion loss for Signal Path B.
Now that path's insertion losses are known, the system gain can be automatically adjusted based on knowing antenna gain ($G_{ANTENNA}$) as:

$$G_A = G_{ANTENNA} \times IL_A$$

$$G_B = G_{ANTENNA} \times IL_B$$

where:
$G_A$ is the system gain for Signal Path A.
$G_B$ is the system gain for Signal Path B.

In an example embodiment, the gain adjustment (e.g., $G_A$ and $G_B$ above) may be automatically adjusted using the antenna DSP 750 and/or the SDU DSP 700 acting as control circuits based on software programming thereof. Thus, as can be appreciated from the descriptions above, the calibration unit 620 may be considered to include the calibration loopback path 770, the path A switch 772, the path B switch 774, the first detector 710, the SDU DSP 700, the second detector 752, and the antenna DSP 750.

Thus, an example embodiment may provide a calibration unit for calibrating a single cable interface operably coupling an SDU to an antenna. The calibration unit may include a calibration loopback path operably coupled to a first path of the antenna and a second path of the antenna, a first path switch and a second path switch operably coupled to the first and second paths of the antenna, respectively, to alternately connect and disconnect the first and second paths of the antenna to the calibration loopback path where the first and second paths of the antenna are operably coupled to a first end of the single cable interface, a first detector operably coupled to a second path of the SDU among a first path of the SDU and the second path of the SDU that are each operably coupled to a second end of the single cable interface, the first detector being configured to detect a first signal $P_B$ at the second path of the SDU, an SDU DSP operably coupled to the first detector, a second detector operably coupled to the first path of the antenna to detect a second signal $P_A$ at the first path of the antenna, and an antenna DSP operably coupled to the second detector. The antenna DSP determines a first gain adjustment based on a test signal inserted at the first path of the SDU and the first signal $P_B$ and the second signal $P_A$, and the SDU DSP determines a second gain adjustment based on the test signal, the first signal $P_B$ and the second signal $P_A$.

The calibration unit described above (and an antenna subsystem comprising the same) may include additional features, modifications, augmentations and/or the like to achieve further objectives or enhance operation of the system. The additional features, modifications, augmentations and/or the like may be added in any combination with each other. For example, the first and second gain adjustments may be determined and automatically applied to signals transported via the single cable interface. In an example embodiment, the second path of the SDU includes a frequency down converter, and the second path of the antenna comprises a frequency up converter. In some cases, the single cable interface may include a single RF coaxial cable, a multiplexer and a de-multiplexer. In an example embodiment, the first and second paths of the SDU may be operably coupled to the single cable interface via an SDU splitter/combiner that multiplexes or de-multiplexes signals onto/from the single RF coaxial cable, and the first and second paths of the antenna may be operably coupled to the single cable interface via an antenna splitter/combiner that multiplexes or de-multiplexes signals onto/from the single RF coaxial cable.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A calibration unit for calibrating a single cable interface operably coupling a satellite data unit (SDU) to an antenna, the calibration comprising:
 a calibration loopback path operably coupled to a first path of the antenna and a second path of the antenna;
 a first path switch and a second path switch operably coupled to the first and second paths of the antenna, respectively, to alternately connect and disconnect the first and second paths of the antenna to the calibration loopback path, the first and second paths of the antenna being operably coupled to a first end of the single cable interface;
 a first detector operably coupled to a second path of the SDU among a first path of the SDU and the second path of the SDU that are each operably coupled to a second end of the single cable interface, the first detector being configured to detect a first signal $P_B$ at the second path of the SDU;
 an SDU digital signal processor (DSP) operably coupled to the first detector;
 a second detector operably coupled to the first path of the antenna to detect a second signal $P_A$ at the first path of the antenna; and
 an antenna DSP operably coupled to the second detector,
 wherein the antenna DSP determines a first gain adjustment based on a test signal inserted at the first path of the SDU and the first signal $P_B$ and the second signal $P_A$, and
 wherein the SDU DSP determines a second gain adjustment based on the test signal, the first signal $P_B$ and the second signal $P_A$.

2. The calibration unit of claim 1, wherein the first and second gain adjustments are determined and automatically applied to signals transported via the single cable interface.

3. The calibration unit of claim 2, wherein the second path of the SDU includes a frequency down converter, and
 wherein the second path of the antenna comprises a frequency up converter.

4. The calibration unit of claim 1, wherein the single cable interface comprises a single RF coaxial cable, a multiplexer and a de-multiplexer.

5. The calibration unit of claim 4, wherein the first and second paths of the SDU are operably coupled to the single cable interface via an SDU splitter/combiner that multiplexes or de-multiplexes signals onto/from the single RF coaxial cable, and
 wherein the first and second paths of the antenna are operably coupled to the single cable interface via an antenna splitter/combiner that multiplexes or de-multiplexes signals onto/from the single RF coaxial cable.

6. The calibration unit of claim 1, wherein the first antenna gain is determined as $G_A = G_{ANTENNA} \times IL_A$,
 wherein the second antenna gain is determined as $G_B = G_{ANTENNA} \times IL_B$,
 wherein the test signal is $P_{TEST}$, and insertion losses for traversed signal paths are determined as:

$$IL_A = \frac{P_{TEST}}{P_A}$$

$$IL_B = \frac{P_A}{P_B}$$

where:
 $IL_A$ is insertion loss for the first path of the antenna,
 $IL_B$ is insertion loss for the second signal path of the SDU, and
 $G_{ANTENNA}$ is antenna gain.

7. An antenna subsystem comprising:
 an antenna;
 a satellite data unit (SDU);
 a single cable interface for operably coupling the SDU to the antenna; and a calibration unit for calibrating the single cable interface, the calibration unit comprising:

a calibration loopback path operably coupled to a first path of the antenna and a second path of the antenna;

a first path switch and a second path switch operably coupled to the first and second paths of the antenna, respectively, to alternately connect and disconnect the first and second paths of the antenna to the calibration loopback path, the first and second paths of the antenna being operably coupled to a first end of the single cable interface;

a first detector operably coupled to a second path of the SDU among a first path of the SDU and the second path of the SDU that are each operably coupled to a second end of the single cable interface, the first detector being configured to detect a first signal $P_B$ at the second path of the SDU;

an SDU digital signal processor (DSP) operably coupled to the first detector;

a second detector operably coupled to the first path of the antenna to detect a second signal $P_A$ at the first path of the antenna; and an antenna DSP operably coupled to the second detector, wherein the antenna DSP determines a first gain adjustment based on a test signal inserted at the first path of the SDU and the first signal $P_B$ and the second signal $P_A$, and wherein the SDU DSP determines a second gain adjustment based on the test signal, the first signal $P_B$ and the second signal $P_A$.

8. The antenna subsystem of claim 7, wherein the first and second gain adjustments are determined and automatically applied to signals transported via the single cable interface.

9. The antenna subsystem of claim 8, wherein the second path of the SDU includes a frequency down converter, and wherein the second path of the antenna comprises a frequency up converter.

10. The antenna subsystem of claim 7, wherein the single cable interface comprises a single RF coaxial cable, a multiplexer and a de-multiplexer.

11. The calibration unit of claim 10, wherein the first and second paths of the SDU are operably coupled to the single cable interface via an SDU splitter/combiner that multiplexes or de-multiplexes signals onto/from the single RF coaxial cable, and wherein the first and second paths of the antenna are operably coupled to the single cable interface via an antenna splitter/combiner that multiplexes or de-multiplexes signals onto/from the single RF coaxial cable.

12. The antenna subsystem of claim 7, wherein the first antenna gain is determined as $G_A = G_{ANTENNA} \times IL_A$, wherein the second antenna gain is determined as $G_B = G_{ANTENNA} \times IL_B$, wherein the test signal is $P_{TEST}$, and insertion losses for traversed signal paths are determined as:

$$IL_A = \frac{P_{TEST}}{P_A}$$

$$IL_B = \frac{P_A}{P_B}$$

where:
$IL_A$ is insertion loss for the first path of the antenna,
$IL_B$ is insertion loss for the second signal path of the SDU, and
$G_{ANTENNA}$ is antenna gain.

* * * * *